(12) United States Patent
Hahn et al.

(10) Patent No.: US 11,853,603 B2
(45) Date of Patent: *Dec. 26, 2023

(54) HOST MEMORY BUFFER CACHE MANAGEMENT

(71) Applicant: Western Digital Technologies, Inc., San Jose, CA (US)

(72) Inventors: Judah Gamliel Hahn, Ofra (IL); Shay Benisty, Beer Sheva (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/454,880

(22) Filed: Nov. 15, 2021

(65) Prior Publication Data

US 2023/0153027 A1    May 18, 2023

(51) Int. Cl.
  *G06F 3/06*    (2006.01)
(52) U.S. Cl.
  CPC .......... *G06F 3/0659* (2013.01); *G06F 3/0604* (2013.01); *G06F 3/0656* (2013.01); *G06F 3/0679* (2013.01)
(58) Field of Classification Search
  CPC .... G06F 3/0659; G06F 3/0604; G06F 3/0656; G06F 3/0679
  See application file for complete search history.

(56) References Cited

U.S. PATENT DOCUMENTS

| | | | |
|---|---|---|---|
| 8,966,176 B2 | 2/2015 | Duzly et al. | |
| 10,521,118 B2 | 12/2019 | Benisty et al. | |
| 10,572,185 B2 | 2/2020 | Hahn et al. | |
| 10,579,560 B2 | 3/2020 | Lee et al. | |
| 10,725,677 B2 * | 7/2020 | Shechter | G06F 3/0656 |
| 10,970,235 B2 | 4/2021 | Hong et al. | |
| 2016/0246726 A1 | 8/2016 | Hahn | |
| 2017/0242606 A1 | 8/2017 | Vlaiko et al. | |
| 2018/0246809 A1 | 8/2018 | Rebholz et al. | |
| 2020/0310677 A1 | 10/2020 | Byun | |
| 2021/0255801 A1 | 8/2021 | Jang et al. | |

OTHER PUBLICATIONS

International Search Report and Written Opinion for International Application No. PCT/US2022/029365 dated Nov. 17, 2022.

* cited by examiner

*Primary Examiner* — Idriss N Alrobaye
*Assistant Examiner* — Richard B Franklin
(74) *Attorney, Agent, or Firm* — PATTERSON + SHERIDAN, LLP; Steven H. VerSteeg

(57) ABSTRACT

The present disclosure generally relates to host memory buffer (HMB) cache management. HMB is transient memory and may not always be available. For example, when the link between the data storage device and the host device is not active, the data storage device can't access the HMB. Placing an HMB log in the HMB controller that is disposed in the data storage device provides access to data that would otherwise be inaccessible in the HMB. The HMB log contains any deltas that have occurred since either the last copying to an HMB cache in the memory device or any delta that have occurred since the link became inactive. The HMB cache mirrors the HMB. In so doing, the data of the HMB is available to the data storage device not only when the link is active, but also when the link is not active.

20 Claims, 6 Drawing Sheets

HOST MEMORY BUFFER CACHE MANAGEMENT

BACKGROUND OF THE DISCLOSURE

Field of the Disclosure

Embodiments of the present disclosure generally relate to host memory buffer (HMB) cache management.

Description of the Related Art

SSDs are connected to a host device through a PCIe interface. The PCIe interface is used to satisfy a required protocol by meeting a given performance requirement. Client storage devices typically use a host memory buffer (HMB) in order to cache metadata such as logical to physical (L2P) tables, parity buffers, and other internal information. The metadata is paged into and out of internal SRAM in order to provide a balance between controller cost and performance. The HMB is provided by the host device, and is allocated from the host dynamic random access memory (DRAM). The data storage device accesses the HMB directly using peripheral component interconnect express (PCIe) transactions after the initial setup using a set of nonvolatile memory express (NVMe) commands.

To achieve optimal performance, data storage devices may need to perform maintenance during idle time. Ideally, the maintenance can leverage the HMB in order to provide buffer space for tables and operational data. However, host power management guidelines often restrict link power and discourage the use of HMB while the host device is idle because the host power required to maintain the link, PCIe root complex, and DRAM active may be significantly higher than storage device power.

As such, storage devices may need to maintain multiple flows—one for active power with HMB access and a secondary flow for the same operations in which the HMB is limited or not used. Such multiple flows increase device complexity and offers a potential surface for firmware (FW) issues.

Therefore, there is a need in the art for an improved HMB cache management.

SUMMARY OF THE DISCLOSURE

The present disclosure generally relates to host memory buffer (HMB) cache management. HMB is transient memory and may not always be available. For example, when the link between the data storage device and the host device is not active, the data storage device can't access the HMB. Placing an HMB log in the HMB controller that is disposed in the data storage device provides access to data that would otherwise be inaccessible in the HMB. The HMB log contains any deltas that have occurred since either the last copying to an HMB cache in the memory device or any delta that have occurred since the link became inactive. The HMB cache mirrors the HMB. In so doing, the data of the HMB is available to the data storage device not only when the link is active, but also when the link is not active.

In one embodiment, a data storage device comprises: a memory device; and a controller coupled to the memory device, wherein the controller is configured to: determine whether a link is active between a host memory buffer (HMB) and the controller; write data into a cache, wherein the data written into the cache is data intended to be written in the HMB, wherein the data is delta data; and update a HMB log to indicate a presence of delta data.

In another embodiment, a data storage device comprises: a memory device; and a controller coupled to the memory device, wherein the controller is configured to: receive a request to write data to a host memory buffer (HMB); log an indication of the write to a HMB log; write the data into a cache, wherein the data is delta data; receive a read request to read data from HMB; retrieve a portion of requested data from a location other than HMB; retrieve the delta data; and return the delta data and the portion of requested data to fulfil the read request.

In another embodiment, a data storage device comprises: memory means; and a controller coupled to the memory means, wherein the controller is configured to: receive requests to read data from and write data to a host memory buffer (HMB); process the read requests by retrieving requested data from a location other than the HMB; and process the write requests by writing data to a location other than the HMB, wherein the data is written to HMB after writing the data to the location other than the HMB.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to host memory buffer (HMB) cache management. HMB is transient memory and may not always be available. For example, when the link between the data storage device and the host device is not active, the data storage device can't access the HMB. Placing an HMB log in the HMB controller that is disposed in the data storage device provides access to data that would otherwise be inaccessible in the HMB. The HMB log contains any deltas that have occurred since either the last copying to an HMB cache in the memory device or any delta that have occurred since the link became inactive. The HMB cache mirrors the HMB. In so doing, the data of the HMB is available to the data storage device not only when the link is active, but also when the link is not active.

Figure 1:
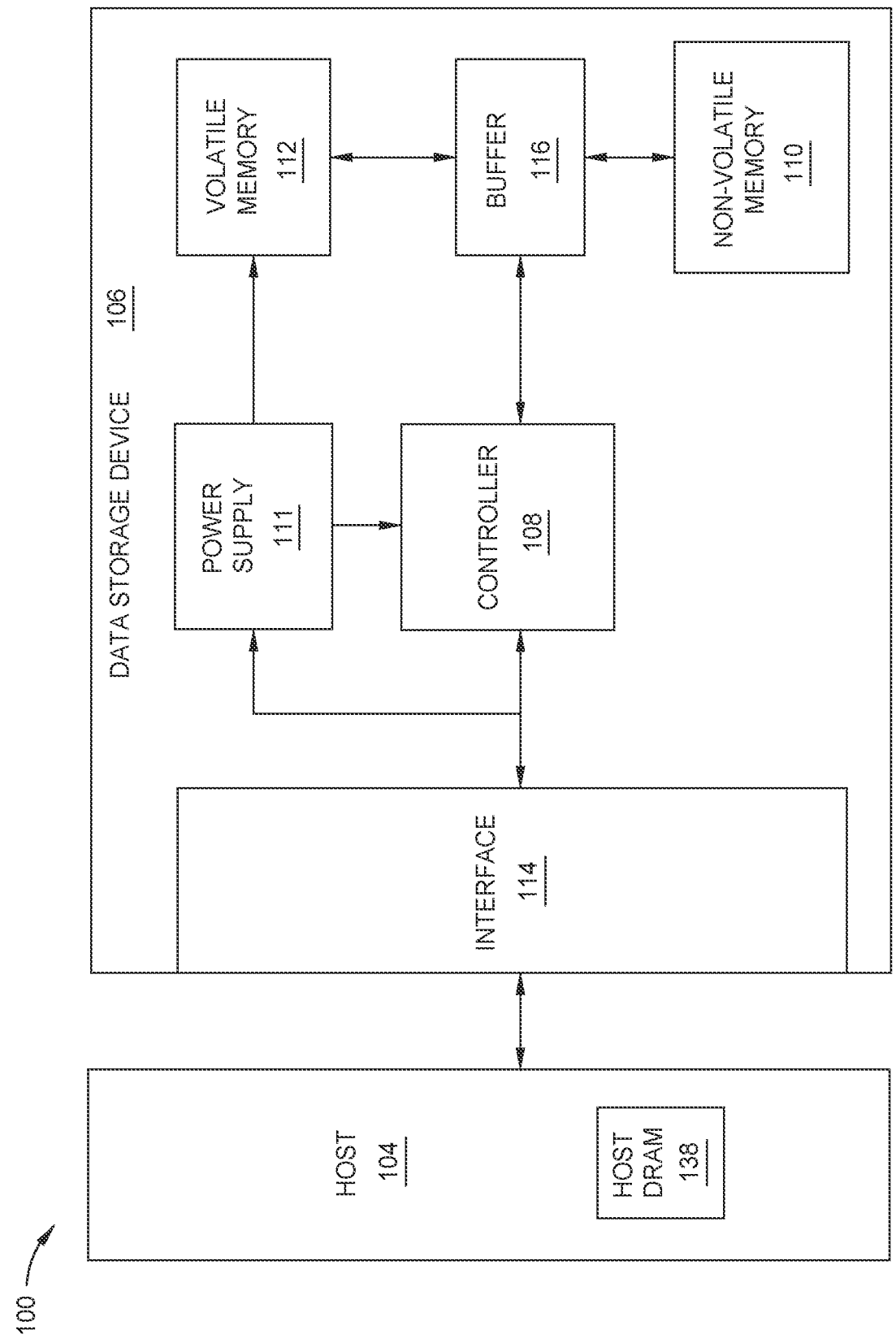
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
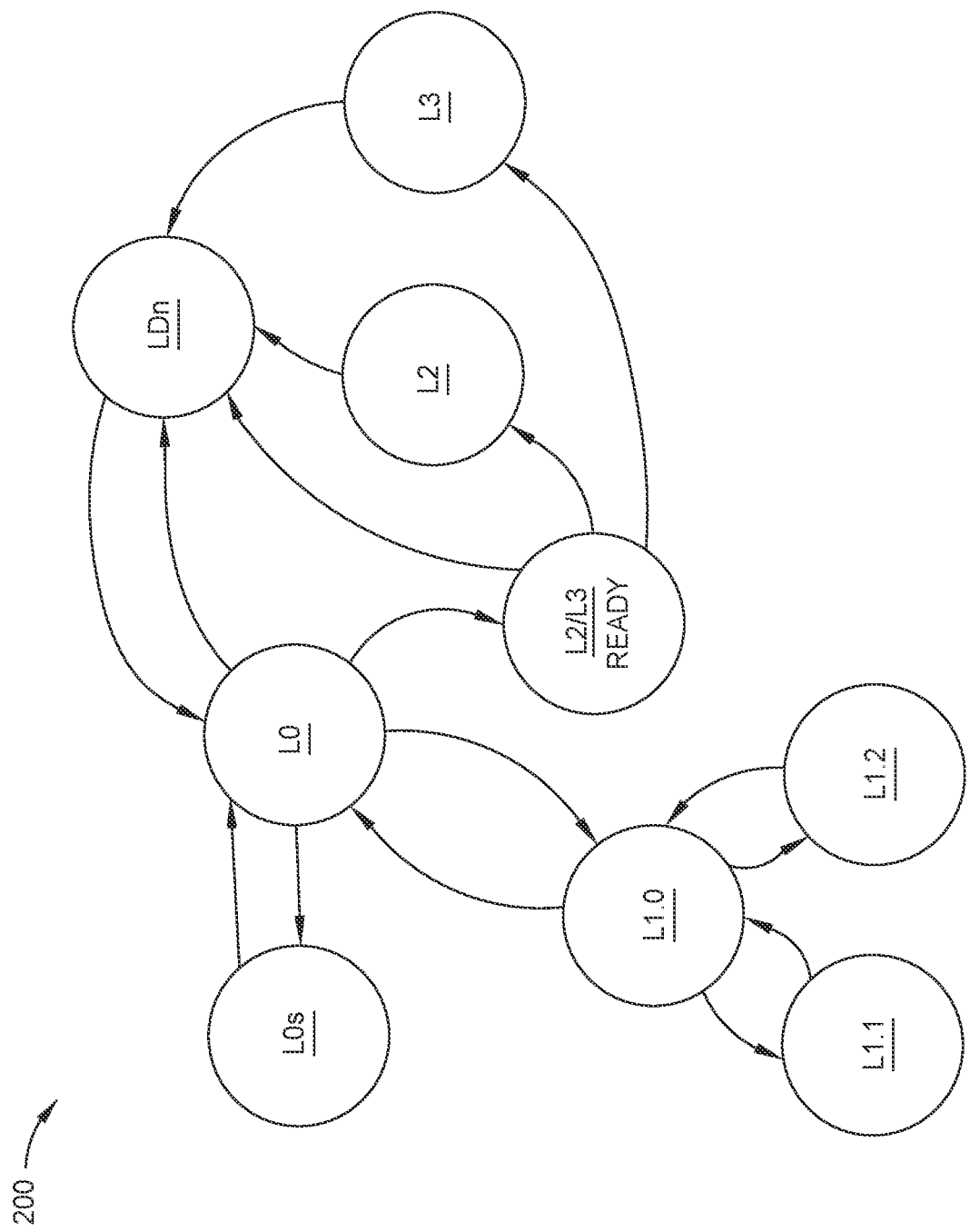
FIG. 2 is an illustration of a link power management flow diagram, according to certain embodiments.

FIG. 2 is an illustration of a link state flow diagram 200, according to certain embodiments. Aspects of the storage system 100 may be referenced in the description herein for exemplary purposes. The data storage device 106 includes several link states. For example, the data storage device 106 may have the following 5 link states: L0, L0s, L1, L2, and L3, where L1 includes a L1.1 sub-state and a L1.2 sub-state. Each of the link states are associated with a distinct operation of the data storage device 106. Link states L0, L0s, and L1 are considered operational link states and utilize a first range of power, whereas link states L2 and L3 are considered non-operational link states, utilizing a second range of power, where the first range of power is greater than the second range of power.

An operational link state refers to the ability of the host device 104 to communicate with the NVM 110 of the data storage device 106. A non-operational link state refers to the inability of the host device 104 to communicate with the NVM 110 of the data storage device 106 due to a shut down or disconnection of a link between the host device 104 and the controller 108. The listed non-operational link states are not intended to be limiting and may include other link states, such as the L1.1 and L1.2 link states. Furthermore, it is contemplated that more or less link states than the number of link states shown in the link state flow diagram 200 may be available and more or less low power link states may be applicable to the embodiments described herein.

Link states are numbered sequentially, where higher numbers represent lower power requirements due to a greater number of offline circuits and corresponding higher exit latencies. Furthermore, each link state has an associated power requirement and an exit latency. L0 and L0s may require 4.5 W with the lowest exit latency. L1 may require less power than L0, such as 3 W, and may have an exit latency equal to or higher than the exit latency of L0. L2 may require less power than L1 and may have an exit latency equal to or higher than the exit latency of L1. L3 may require less power than L2 and may have an exit latency equal to or higher than the exit latency of L2. The values for the link states and exit latencies are not intended to be limiting, but to provide an example of possible embodiments.

L0 is referred to as a fully operational state, where I/O commands are enabled, and the device may generate interrupts. L0 is a link state where the link is operating normally. Interrupts are an automatic transfer of firmware execution due to a system timer or a user command. Link states L0s and L1 are also operational states; however, L0s and L1 may have a lower functionality than that of L0. For example, L0s has a similar power requirement as that of the L0, but only allows for a serial link in one direction. In the L0s link state, data may be transferred in one direction, but not the other. Thus, when a first device is coupled to a second device through a link, the first device may idle a transmitter of the first device independently and separately of the second device idling a transmitter of the second device, and/or vice-versa.

However, L1 allows for a bidirectional serial link and allows for a greater reduction in the power requirement, but has a higher exit latency than that of L0 and L0s. In the L1 link state, no data is being transferred so key portions of the PCIe transceiver logic may be turned off. Link states L2 and L3 are non-operational link states have a power requirement less than that of the operational link states. The difference between the L2 link state and the L3 link state is that auxiliary power has not been yet removed from the L2 link state. Furthermore, the memory devices of the NVM 110 that are not used are placed in a non-operational link state, L2 and L3, to limit the idle power consumption to a minimal value.

In order for I/O commands to occur, the link, such as a data bus, between the host device 104 and the controller 108 is woken up and placed into the L0 link state. The controller 108 changes the link state of the link between the host device 104 and the controller 108 from the operational link states, such as L0, L0s, or L1, to a different operational link state, such as L0, L0s, or L1, or to a non-operational link state, such as L2 or L3, depending on the situation. However, in order for the link to be placed into L2 or L3, the link will need to be in link state L2/L3 ready, which is a pseudo-state to prepare the component for a loss in power and reference clock(s). The controller 108 allocates the appropriate amount of power to return all link states L0s, L1, L2, L3 into link state L0 when a full operational state is required. For example, to return to L0 from L2 or L3, the link transitions to a transient pseudo-state, LDn, before transitioning to L0. The LDn state may be a fundamental reset state, a hot reset state, or a link disable transmission state by the upstream component (e.g., the host device 104).

The link state L1, in some embodiments, includes additional sub-states, L1.1 and L1.2, where the link state L1 may be referred to as L1.0. The L1 sub-states (L1SS), L1.1 and L1.2, may require more power for operation than L2 and L3; however, the L1SS utilizes less power than the L1.0 state. At an L1 SS, the link remains operational and requires less power to return to a more operational state, such as L1.0 or L0. Furthermore, the L1SS requires less time than the L2 and/or the L3 link states to return to a full active link state L0.

As will be discussed below, when the link between the host device and the data storage device is not active (i.e., when the power state is L1 or lower state), a transparent caching and management engine at the HMB controller will permit access to the data of the HMB. The HMB controller will mirror the HMB to the memory device. The engine will capture HMB write transactions when the PCIe link is restricted and replay the write transactions after the link is active. Read transactions will be redirected to a corresponding storage location in the memory device. Suitable storage locations include SLC buffers, any non-volatile storage medium, or a power-fail-protected medium for example.

Figure 3:
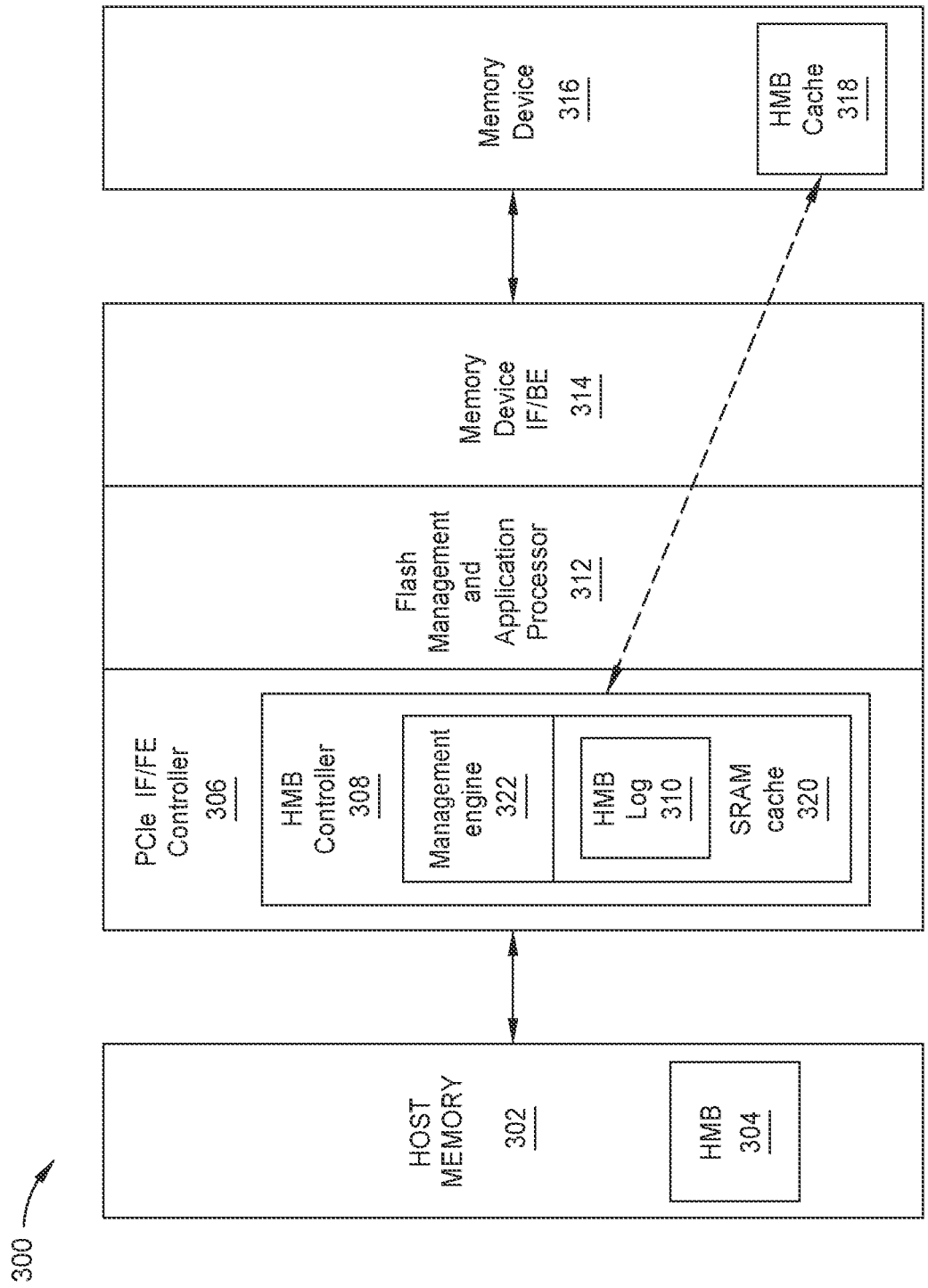
FIG. 3 is a schematic illustration of a HMB controller with cache management according to one embodiment.

FIG. 3 is a schematic illustration 300 of a HMB controller with cache management according to one embodiment. As shown in FIG. 3, the host memory 302 includes the HMB 304 which is accessed by the data storage device via the PCIe interface/front end controller 306. The controller 306 includes the HMB controller 308. An HMB log 310 is disposed in the HMB controller 308. The controller 306 sends any data for the HMB cache 318 that is disposed in the memory device 316 through the flash management and application processor 312 and memory device interface/back end 314. The HMB controller 308 with HMB log 310 takes advantage of a few key features of HMB usage in client environments: HMB footprint is relatively small (e.g., 64 MB or less); while L2P updates can be made to HMB before L2P updates are saved in the memory device, most metadata ends up in the memory device eventually; and performance sensitive access to HMB is always when the link is fully active—idle access to HMB is not performance sensitive.

The management engine 322 sits within the HMB controller 308 and maintains a local SRAM cache 320 that mirrors the most active part of the HMB 304. A HMB log 310 of HMB access is also maintained in the SRAM cache 320, while access beyond the most recent may spill over to the dedicated log space within the memory device or other nonvolatile media. When the PCIe link is reduced to L1 or lower (L1.2 or L2/L3 ready), all outstanding HMB accesses are redirected to the engine and fulfilled from either SRAM cache 320 or the memory device 316 HMB cache 318. However, from a device firmware perspective, the management engine 322 is transparent and HMB requests continue to be created and answered. It is to be understood that while a SRAM cache 320 has been discussed and exemplified, the local storage is not limited to SRAM cache 320. Rather, the local storage may be any volatile or non-volatile fast storage medium.

As such, the appearance of the HMB being always available is maintained because the HMB controller 308 ensures the data residing in or expected to be residing in HMB 304 is always accessible through the HMB controller 308, even when the link is not active. Every entry in HMB 304 is shadowed in the memory device 316, or more specifically the HMB cache 318, and any deltas are tracked within the HMB log 310 and maintained within the SRAM cache 320. It is to be understood that while a SRAM cache 320 has been discussed and exemplified, the local storage is not limited to SRAM cache 320. Rather, the local storage may be any volatile or non-volatile fast storage medium. Thus, any read operations can go through the HMB 304 when the link is active or the memory device 316, with deltas from the HMB controller 308, when the link is not active.

The HMB controller 308 can be either firmware or hardware, and controls the HMB 304 and error correction. The HMB log 310 shadows anything in the HMB 304 and sends the shadowed info to the HMB cache 318. If the link between the host device and the data storage device is active, then all HMB reads/writes go to the HMB 304 and are logged in the HMB log 310 with any deltas that have not been mirrored to HMB cache 318 present in the SRAM cache 320. Eventually, the data will be mirrored in the HMB cache 318. If the link between the host device and the data storage device is not active, then all HMB reads/writes go to the HMB cache 318 with any deltas, which are logged in the HMB log 310, retrieved from SRAM cache 320.

Figures 4A, 4B:
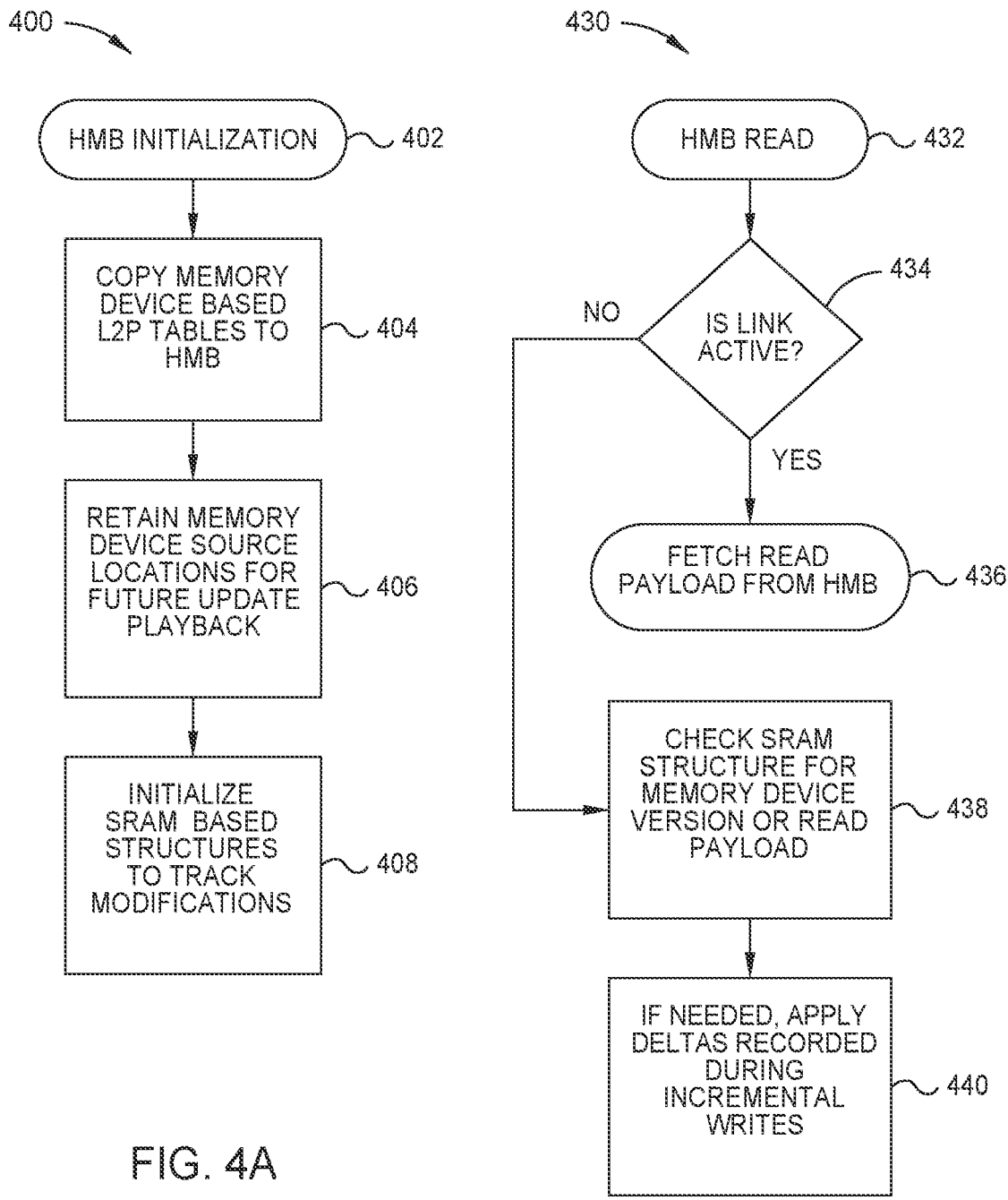
FIGS. 4A-4C are flowcharts illustrating the logic of a cache management engine of HMB according to one embodiment.
Figure 4C:
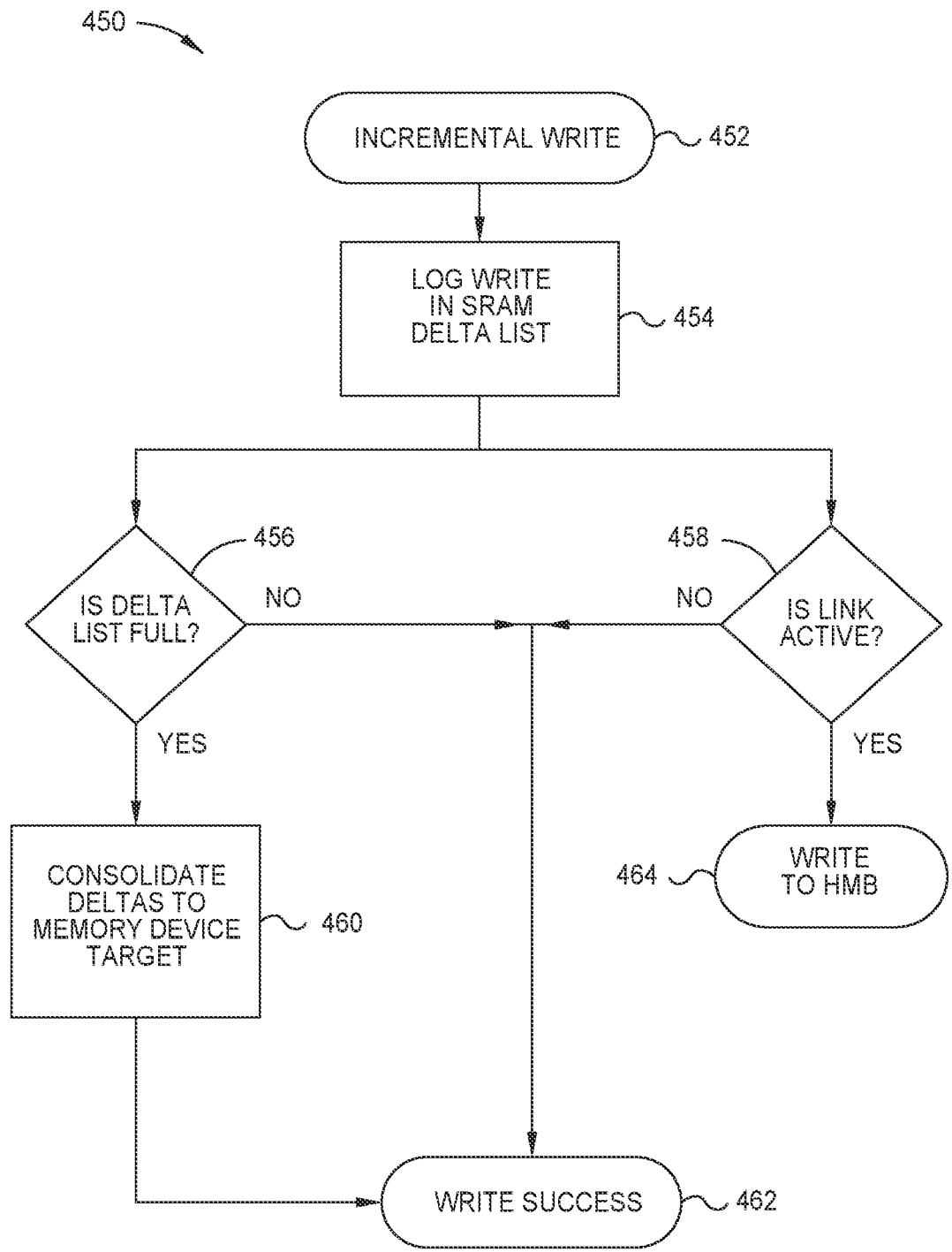

FIGS. 4A-4C are flowcharts 400, 430, 450 illustrating the logic of a cache management engine of HMB according to one embodiment. As shown in FIG. 4A, HMB initialization occurs at 402 and L2P tables are copied from the memory device (e.g., NAND) to HMB at 404. The source locations of the tables is retained within the HMB controller to serve as a baseline for when the HMB is offline. Other sources may be used as well, or a dedicated SLC buffer may be designated for the purpose. Memory device source locations are retained for future update playback at 406, and SRAM based structures to track modifications are initialized at 408. It is to be understood that while a dedicated SRAM buffer has been discussed and exemplified, the local storage is not limited to a dedicated SRAM buffer. Rather, the local storage may be any volatile or non-volatile fast storage medium.

A delta list of modifications is maintained in SRAM and also in the memory device (e.g., NAND). The delta list is initially empty, as HMB and memory device are in sync. As the storage firmware writes incremental updates to the HMB, the updates are automatically logged into the SRAM delta list. The deltas may then be consolidated back to their original source or spilled over into a memory device (e.g., NAND) based location once the SRAM list reaches a maximum size. Periodically, the original location is resynchronized with the HMB, and the delta list is reset. The rest will generally occur after a threshold is reached or before performing maintenance operations.

As shown in FIG. 4B, when the storage firmware issues a HMB read command at 432 to the HMB controller, the HMB controller will check if the PCIe link is active at 434. If the link is active, then the command will be passed through to the HMB and the read payload will be fetched from HMB at 436. If, however, the link is in a low power state, then read commands will be resolved by using a combination of the original source in the memory device (or any other buffer that holds the source content) and any delta applied since the last consolidation. More specifically, the SRAM structure is checked for the memory device version or read payload at 438 and if needed, any deltas recorded during incremental writes are applied at 440. It is to be understood that while a SRAM structure has been discussed and exemplified, the local storage is not limited to a SRAM structure. Rather, the local storage may be any volatile or non-volatile fast storage medium. Once the link is resumed, all staged deltas are replayed back to the HMB so that new reads can be served directly from the HMB instead of by applying new updates in every read.

As shown in FIG. 4C, when the storage firmware issues a HMB incremental write command at 452 to the HMB controller, the HMB controller will log the write command in the SRAM delta list at 454 and perform two checks. One check is to see if the link is active at 458. If the link is active at 458, then the data is written to HMB at 464. If the link is not active, then the write occurs to the SRAM cache, and eventually the HMB cache in the memory device at 462. The additional check is to determine whether the delta list is full at 456. If the delta list is not full, then the write occurs to the SRAM cache, and eventually the HMB cache in the memory device at 462. If the delta list is full at 456, then the deltas are consolidated to the memory device target at 460.

If the memory device HMB cache is not yet updated, then the deltas will be necessary and must be kept, even if consolidated. Additionally, the HMB may be updated prior to updating the HMB cache in the memory device with the deltas. Furthermore, if a write to the HMB occurs when the link is not active, the only update to the HMB that will be necessary upon link restoration will be the deltas, which are kept in SRAM. The deltas stored in SRAM are sent to the HMB once the link is active. If there are too many deltas, then the deltas are sent to the memory device and in particular, the HMB cache, which can later be resynced with the HMB upon restoration of the link. The incremental cache buffer for writes is transparent to the firmware logic.

Figure 5:
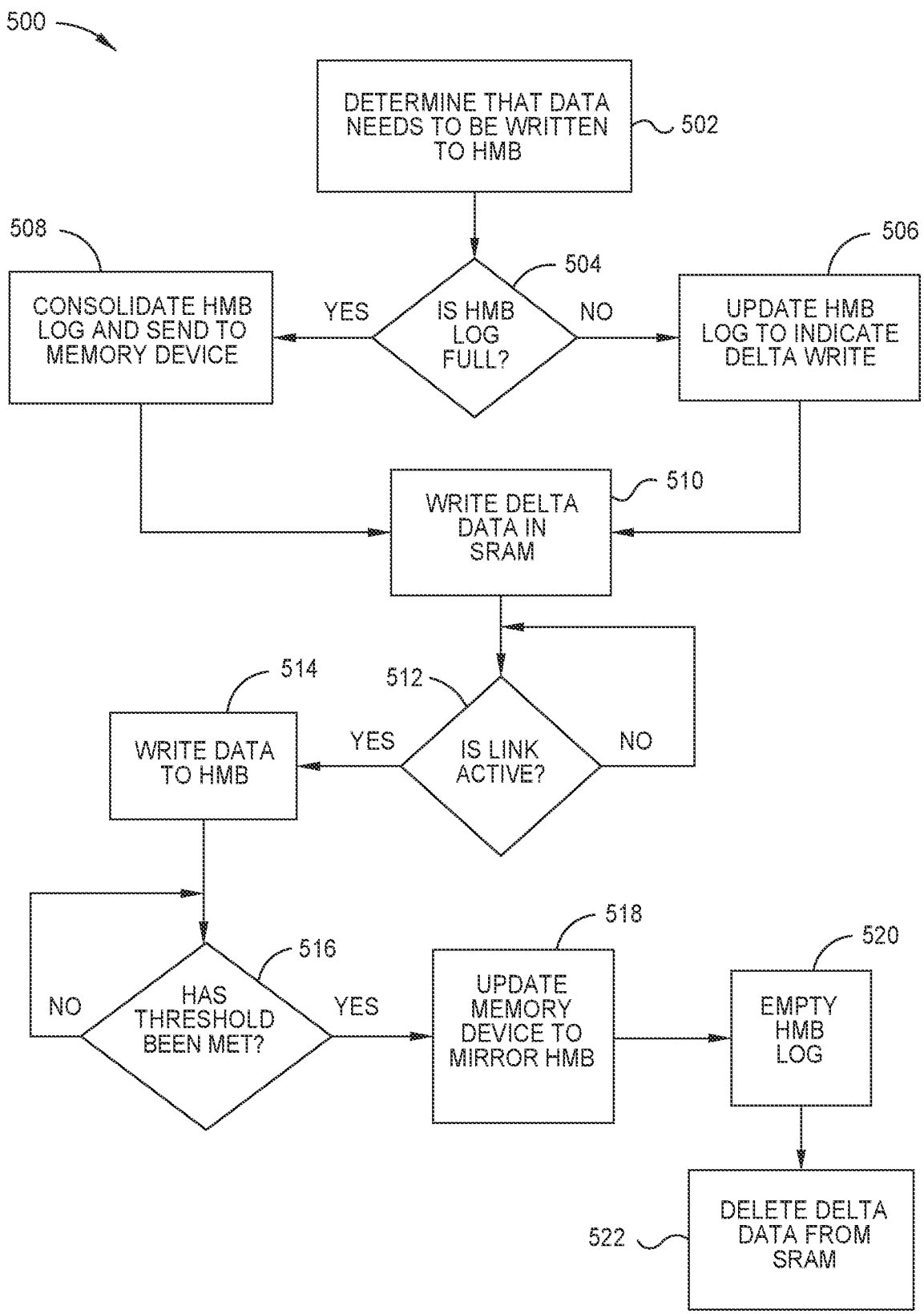
FIG. 5 is a flowchart illustrating HMB cache management according to one embodiment.

FIG. 5 is a flowchart 500 illustrating HMB cache management according to one embodiment. Initially, a determination is made that data needs to be written to the HMB at 502. Based upon the determination, another determination is made. Specifically, a determination regarding whether the HMB log, which is disposed in the HMB controller located in the data storage device, is full at 504. If the HMB log is full, then the data of the HMB log needs to be consolidated and sent to the memory device at 508. If, however, the HMB log is not full, then the HMB log is updated to indicate that a delta write is to occur at 506. A delta write is a write to the HMB that changes, or causes a delta, of the data already in HMB. The delta can be new data to the HMB or updating data already present in HMB. In any event, the HMB log is updated, and the actual delta data is written in SRAM at 510.

At this point in time, the delta data, and the log of the delta data, is present in the data storage device, and more particularly, the HMB controller of the data storage device. The delta data needs to be written to the HMB, therefore the HMB controller determines whether the link between the HMB and the data storage device is active at 512. If the link is not active, the HMB controller waits until the link is eventually active. In the meantime, while the link is not active, any new incremental write requests to HMB will be handled according to the process beginning at 502.

If the link is active at 512, then the delta data is written to HMB at 514. If a threshold has been met at 516, then the data is mirrored to the memory device at 518 as HMB cache, the HMB log is emptied at 520, and the delta data is deleted from SRAM at 522 as the HMB cache and the HMB are identical at this point in time. The threshold may be a time threshold for example or a number of write delta writes. If the threshold has not been met, then the memory device is not updated and hence the HMB and HMB cache will be different, with the difference being the delta data noted in the HMB log and contained in the SRAM.

HMB read requests are processed normally when the link between the HMB and the HMB controller is active. When the link is active, the data is simply read from HMB. It is contemplated, however, that the HMB has not yet been updated with delta data. Hence, prior to performing an HMB read, any delta data is written to HMB.

When the link is not active, the data is instead fetched from the HMB cache, and the delta data is fetched from the SRAM cache. In so doing, the HMB read request is fulfilled even though the HMB is not accessible. The delta data, which is incremental writes that have not yet been written to HMB, can in fact be read. In absence of the incremental writes or delta data being stored outside of the HMB, the HMB read request either could not be performed or could return invalid data because the data retrieved from HMB cache would be incomplete (i.e., delta data would be missing). With the delta data being stored, the HMB request can be performed and provide valid data.

By shadowing the HMB with an HMB log, HMB data can be easily retrieved when the link between the data storage device and the host device is not active. Furthermore, any deltas that have occurred since the last copying of the HMB to the HMB cache in the memory device are found in the HMB log.

Additionally, any deltas that have occurred while the link was inactive can be copied to the HMB upon activation of the link. Furthermore, better control of HMB cache management in hardware allows for full alignment with NVMe protocols and reduces potential host power without complicating the firmware logic that utilizes HMB. Implementation of the features in the controller can eliminate potential corner cases where firmware is not fully synchronized with link power management. The embodiments described herein improves HMB management and simplifies HMB interactions when aggressive host side power management policies are applied.

In one embodiment, a data storage device comprises: a memory device; and a controller coupled to the memory device, wherein the controller is configured to: determine whether a link is active between a host memory buffer (HMB) and the controller; write data into a cache, wherein the data written into the cache is data intended to be written in the HMB, wherein the data is delta data; and update a HMB log to indicate a presence of delta data. The controller is further configured to update HMB with the delta data once the link is active and wherein the controller is further configured to mirror data in the HMB by writing data to an HMB cache disposed in the memory device. The determining determines that the link is not active, wherein upon updating the HMB log, data in the HMB is different from data stored in an HMB cache. The data in HMB is identical to a combination of data stored in HMB cache and the delta data.

In another embodiment, a data storage device comprises: a memory device; and a controller coupled to the memory device, wherein the controller is configured to: receive a request to write data to a host memory buffer (HMB); log an indication of the write to a HMB log; write the data into a cache, wherein the data is delta data; receive a read request to read data from HMB; retrieve a portion of requested data from a location other than HMB; retrieve the delta data; and return the delta data and the portion of requested data to fulfil the read request. The controller is further configured to determine that a link between the controller and the HMB is not active. The link is not active when the portion of requested data and the delta data are retrieved. The cache is disposed in the controller. The portion of requested data is retrieved from an HMB cache. The HMB cache is disposed in the memory device. The controller is further configured to write the delta data to HMB upon determining that a link between the HMB and the controller is active. The controller is configured to write the delta data to HMB prior to receiving the read request. The controller is configured to determine whether the HMB log is full. The controller is configured to consolidate data from the HMB log and flush the consolidated data to the memory device.

In another embodiment, a data storage device comprises: memory means; and a controller coupled to the memory means, wherein the controller is configured to: receive requests to read data from and write data to a host memory buffer (HMB); process the read requests by retrieving requested data from a location other than the HMB; and process the write requests by writing data to a location other than the HMB, wherein the data is written to HMB after writing the data to the location other than the HMB. The data associated with the read request is disposed in HMB, the memory means, and a SRAM cache. The controller further comprises a management engine, wherein the management engine comprises an HMB log and SRAM cache. The location other than the HMB comprises a cache disposed in the controller. The controller is further configured to log writing of data to the location other than the HMB. The controller is further configured to copy data from the location other than the HMB to the HMB upon determining that a link between the HMB and the controller is active.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   determine whether a link is active between a host memory buffer (HMB) and the controller;
   write data into a cache, wherein the data written into the cache is data intended to be written in the HMB, wherein the data is delta data; and
   update a HMB log to indicate a presence of delta data.

2. The data storage device of claim 1, wherein the controller is further configured to update HMB with the delta data once the link is active and wherein the controller is further configured to mirror data in the HMB by writing data to an HMB cache disposed in the memory device.

3. The data storage device of claim 1, wherein the determining determines that the link is not active, wherein upon updating the HMB log, data in the HMB is different from data stored in an HMB cache.

4. The data storage device of claim 3, wherein the data in HMB is identical to a combination of data stored in HMB cache and the delta data.

5. A data storage device, comprising:
   a memory device; and
   a controller coupled to the memory device, wherein the controller is configured to:
   receive a request to write data to a host memory buffer (HMB);
   log an indication of the write to a HMB log;
   write the data into a cache, wherein the data is delta data;
   receive a read request to read data from HMB;
   retrieve a portion of requested data from a location other than HMB;
   retrieve the delta data; and
   return the delta data and the portion of requested data to fulfil the read request.

6. The data storage device of claim 5, wherein the controller is further configured to determine that a link between the controller and the HMB is not active.

7. The data storage device of claim 6, wherein the link is not active when the portion of requested data and the delta data are retrieved.

8. The data storage device of claim 5, wherein the cache is disposed in the controller.

9. The data storage device of claim 5, wherein the portion of requested data is retrieved from an HMB cache.

10. The data storage device of claim 9, wherein the HMB cache is disposed in the memory device.

11. The data storage device of claim 5, wherein the controller is further configured to write the delta data to HMB upon determining that a link between the HMB and the controller is active.

12. The data storage device of claim 5, wherein the controller is configured to write the delta data to HMB prior to receiving the read request.

13. The data storage device of claim 5, wherein the controller is configured to determine whether the HMB log is full.

14. The data storage device of claim 5, wherein the controller is configured to consolidate data from the HMB log and flush the consolidated data to the memory device.

15. A data storage device, comprising:
    memory means; and
    a controller coupled to the memory means, wherein the controller is configured to:
    receive requests to read data from and write data to a host memory buffer (HMB);
    process the read requests by retrieving requested data from a location other than the HMB; and
    process the write requests by writing data to a location other than the HMB, wherein the data is written to HMB after writing the data to the location other than the HMB.

16. The data storage device of claim 15, wherein the data associated with the read request is disposed in HMB, the memory means, and a SRAM cache.

17. The data storage device of claim 15, wherein the controller further comprises a management engine, wherein the management engine comprises an HMB log and SRAM cache.

18. The data storage device of claim 15, wherein the location other than the HMB comprises a cache disposed in the controller.

19. The data storage device of claim 15, wherein the controller is further configured to log writing of data to the location other than the HMB.

20. The data storage device of claim 15, wherein the controller is further configured to copy data from the location other than the HMB to the HMB upon determining that a link between the HMB and the controller is active.

* * * * *